United States Patent
Anderson et al.

(10) Patent No.: US 12,398,676 B2
(45) Date of Patent: Aug. 26, 2025

(54) TONGUE JOINT INCLUDING MATING CHANNEL FOR COOLING

(71) Applicant: RTX Corporation, Farmington, CT (US)

(72) Inventors: Corey D. Anderson, East Hartford, CT (US); Edward Boucher, New Haven, CT (US); Rebecca R. Dunnigan, Sturbridge, MA (US); Nicholas Broulidakis, Vernon, CT (US); Matthew Murakami, West Hartford, CT (US); Daniel R. Brandt, Somerville, MA (US); Konrad Kuc, West Hartford, CT (US); Victoria M. Imlach, Marlborough, CT (US); Sushruth G. Kamath, Manchester, CT (US); Manuel A. Casares Rivas, Hartford, CT (US); Eric G. Leamon, Manchester, CT (US); Adam Castles, West Hartford, CT (US); Edmond Cheung, East Hampton, CT (US); Kyra A. Thole-Wilson, West Hartford, CT (US); Javier Nebero Johnson, South Glastonbury, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/428,025

(22) Filed: Jan. 31, 2024

(65) Prior Publication Data

US 2024/0218830 A1   Jul. 4, 2024

Related U.S. Application Data

(62) Division of application No. 17/967,315, filed on Oct. 17, 2022, now Pat. No. 11,933,221.

(Continued)

(51) Int. Cl.
*F02C 7/18* (2006.01)
*F23R 3/60* (2006.01)

(52) U.S. Cl.
CPC .................. *F02C 7/18* (2013.01); *F23R 3/60* (2013.01); *F05D 2220/32* (2013.01); *F05D 2230/60* (2013.01); *F05D 2260/232* (2013.01)

(58) Field of Classification Search
CPC ..................................... F02C 7/18; F23R 3/60
See application file for complete search history.

(56) References Cited

U.S. PATENT DOCUMENTS

| | | |
|---|---|---|
| 5,350,278 A | 9/1994 | Burge |
| 5,435,139 A | 7/1995 | Pidcock et al. |

(Continued)

FOREIGN PATENT DOCUMENTS

| | | |
|---|---|---|
| EP | 1099826 B1 | 1/2005 |
| EP | 3523507 B1 | 6/2020 |
| FR | 2973433 A1 | 10/2012 |

OTHER PUBLICATIONS

European Search Report for EP Application No. 22203152.8 dated Mar. 15, 2023.

*Primary Examiner* — Katheryn A Malatek
(74) *Attorney, Agent, or Firm* — Carlson, Gaskey & Olds, P.C.

(57) ABSTRACT

A gas turbine engine including a core having a compressor section fluidly connected to a combustor via a primary flowpath and a turbine section connected to the combustor via the core flow path. An assembly is disposed within the gas turbine engine and includes a first part connected to a second part via a radial stack joint. The first part includes a radially inward facing surface contacting a corresponding radially outward facing surface of the second part. A fastener protrudes through the first part and the second part and is configured to maintain the relative positions of the first part (Continued)

and the second part. A channel is disposed on at least one of the radially inward facing surfaces and is positioned between the fastener and a circumferential edge of the first part. The channel is connected to at least one cooling air source.

9 Claims, 2 Drawing Sheets

Related U.S. Application Data

(60) Provisional application No. 63/270,099, filed on Oct. 21, 2021.

(56) References Cited

U.S. PATENT DOCUMENTS

| | | |
|---|---|---|
| 6,238,712 B1 | 5/2001 | Nakashima |
| 10,815,784 B2 | 10/2020 | Capolungo et al. |
| 11,041,461 B2 | 6/2021 | Beach et al. |
| 2002/0187046 A1 | 12/2002 | Beutin et al. |
| 2004/0159107 A1 | 8/2004 | Sullivan et al. |
| 2014/0360196 A1* | 12/2014 | Graves ............ F23R 3/002 60/753 |

* cited by examiner

TONGUE JOINT INCLUDING MATING CHANNEL FOR COOLING

CROSS-REFERENCE TO RELATED APPLICATION

This application is a divisional of U.S. application Ser. No. 17/967,315 filed Oct. 17, 2022, which claims priority to U.S. Provisional Patent Application No. 63/270,099 filed on Oct. 21, 2021.

STATEMENT REGARDING FEDERALLY SPONSORED RESEARCH OR DEVELOPMENT

This invention was made with government support under Contract No. N00019-20-F-0001 awarded by the United States Navy. The government has certain rights in this invention.

TECHNICAL FIELD

The present disclosure relates generally to tongue joints for gas turbine engine systems, and more specifically to tongue joints including a cooling channel positioned between matefaces.

BACKGROUND

Gas turbine engines are used for commercial transportation, commercial shipping, military applications, as well as any number of additional aircraft uses. Common across the uses of gas turbine engines is the need to incorporate part to part interfaces where two parts abut each other and are joined to form the overall structure. Designs for part to part interfaces must ensure that the parts interface correctly, are able to be assembled using a practical assembly process, and are structurally sound. In addition, when part to part interfaces are used in or near the primary flowpath of the gas turbine engine or other heat source it can be important to ensure that the part to part interface provides or is provided sufficient cooling.

Certain types of joints for part to part interfaces add complexity, requiring interfacing elements to have adequate stiffness to maintain the joint and to maintain part to part contact, while at the same time requiring the joint to provide sufficient strength to withstand vibrations and other stresses common within a gas turbine engine.

SUMMARY OF THE INVENTION

In one exemplary embodiment a gas turbine engine includes a core including a compressor section fluidly connected to a combustor via a primary flowpath and a turbine section connected to the combustor via the core flow path, an assembly disposed within the gas turbine engine, the assembly including a first part connected to a second part via a radial stack joint, the first part including a radially inward facing surface contacting a corresponding radially outward facing surface of the second part, a fastener protruding through the first part and the second part and configured to maintain the relative positions of the first part and the second part, and a channel disposed on at least one of the radially inward facing surfaces and positioned between the fastener and a circumferential edge of the first part, the channel being connected to at least one cooling air source.

In another example of the above described gas turbine engine the channel includes a radially outward intrusion into the radially inward facing surface of the first part.

In another example of any of the above described gas turbine engines the channel includes a radially inward intrusion into the radially outward facing surface of the second part.

In another example of any of the above described gas turbine engines the channel includes a radially outward intrusion into the radially inward facing surface of the first part and wherein the radially outward intrusion into the radially inward facing surface is at least partially overlapping the radially inward intrusion into the radially outward facing surface thereby creating a single channel.

In another example of any of the above described gas turbine engines the channel includes at least one cooling hole extending from the channel.

In another example of any of the above described gas turbine engines the least one cooling hole extends at least partially radially outward from the channel.

Another example of any of the above described gas turbine engines further includes a leakage path between the first part and the second part, the leakage path connecting the channel to a portion of the first part connecting the leakage path to a radially outward facing surface of the first part.

In another example of any of the above described gas turbine engines the channel includes at least a portion aligned with the circumferential edge of the first part.

In another example of any of the above described gas turbine engines the channel includes at least a portion unaligned with the circumferential edge of the first part.

In one exemplary embodiment a radial stack joint connecting two parts including a flange extending outward from a first part and having a mating surface, a second part including a second mating surface, the second mating surface contacting the first mating surface, a fastener extending through the first part and the second part at the first and second mating surfaces, and a channel defined in at least one of the first mating surface and the second mating surface.

In another example of the above described radial stack joint connecting two parts the channel is connected to a surface of the second part via a plurality of cooling holes.

In another example of any of the above described radial stack joints connecting two parts the channel includes at least one groove intruding into one of the first mating surface and the second mating surface.

In another example of any of the above described radial stack joints connecting two parts the at least one groove includes a first groove intruding into the first surface and a second groove intruding into the second surface.

In another example of any of the above described radial stack joints connecting two parts the channel includes at least one corner.

In another example of any of the above described radial stack joints connecting two parts the channel is connected to at least a first cooling gas source.

In another example of any of the above described radial stack joints connecting two parts the channel is connected to at least two cooling gas sources.

An exemplary method for cooling a radial stack joint includes providing cooling air from at least a first cooling air source to a channel within a radial stack joint, the channel being defined on at least one mating surface of the radial stack joint.

In another example of the above described method for cooling a radial stack joint the radial stack joint joins at least two components, and wherein a non-mating surface of at least one of the at least two components is cooled via a plurality of cooling holes connected to the channel.

In another example of any of the above described methods for cooling a radial stack joint the channel vents cooling air through an interface gap of the radial stack joint.

In another example of any of the above described methods for cooling a radial stack joint the channel includes at least one corner.

These and other features of the present invention can be best understood from the following specification and drawings, the following of which is a brief description.

DETAILED DESCRIPTION

Figure 1:
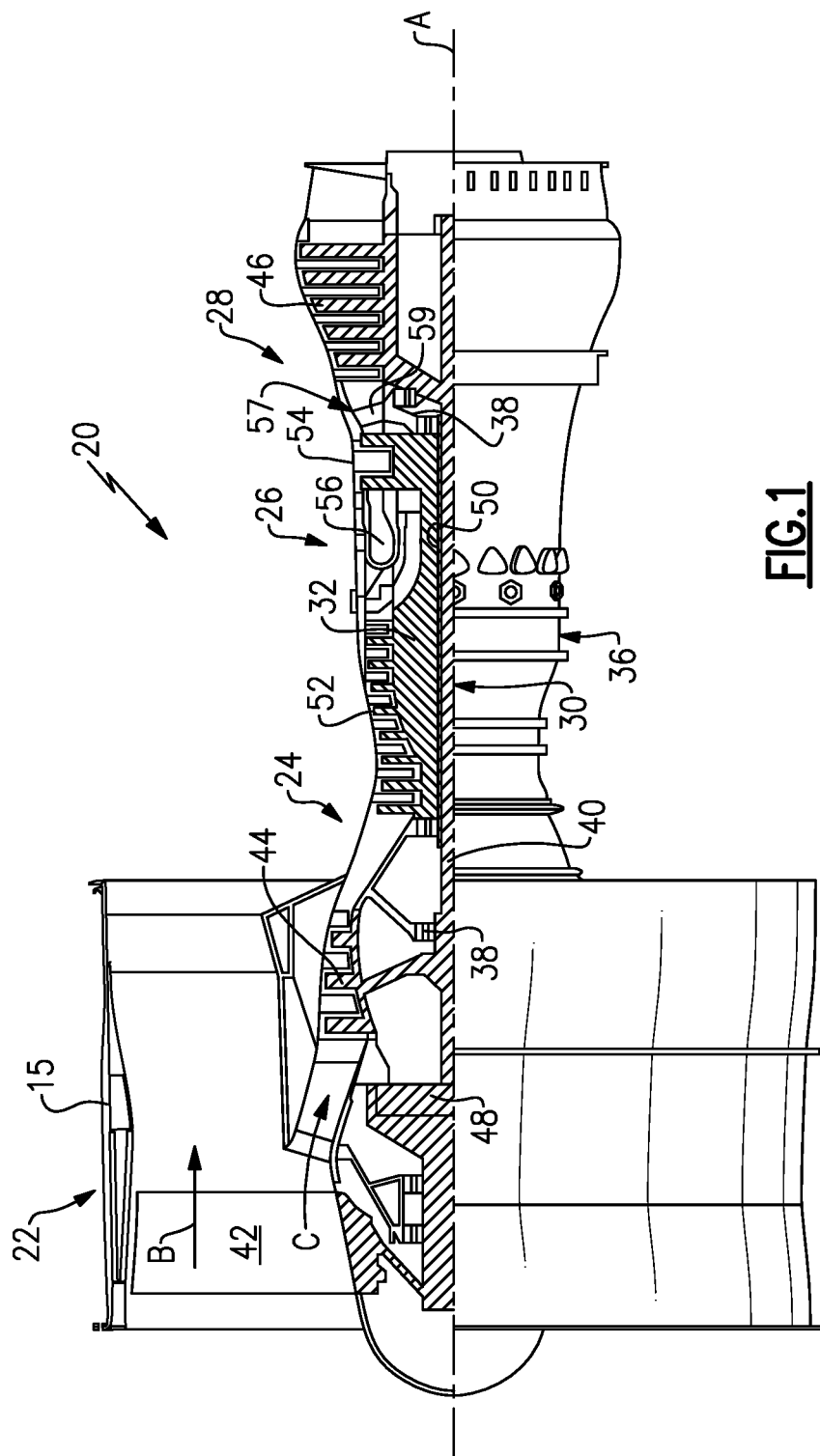
FIG. 1 illustrates a gas turbine engine including multiple components joined using the part to part interfaces illustrated in FIGS. 2A-7.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°\ R)]^{0.5}$. The "Low corrected fan tip speed" as disclosed herein according to one non-limiting embodiment is less than about 1150 ft/second (350.5 meters/second).

The combustor 56 in one example includes a wall constructed of multiple combustor panels, each of the panels being connected to at least one of the other combustor panels or an underlying combustor structure via a part to part interface including a tongue groove joint. The tongue joint mates the two parts, allowing them to form a complete structure. One problem that can arise from a tongue joint, and particularly a tongue joint in a combustor area or other high heat areas of the engine, is the thermal behavior of the parts. The thickness of the tongue joint can insulate the outer portion of the joint. In addition, the joint can include a leakage path that allows part to part leakage flow to leak out in the localized area of the joint resulting in a local hotspot.

Further, while described within the context of combustor panels for a commercial gas turbine engine, it is appreciated that the tongue joints described below can be suitable for use in any gas turbine engine, and for multiple parts within gas turbine engines including turbine exhaust case components, turbine vanes, blade outer air seals, combustor components and the like.

Figure 2A:
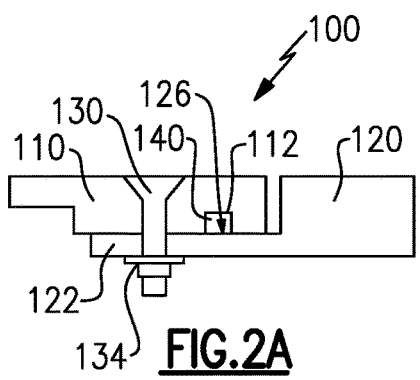
FIG. 2A illustrates a cross section of a first example tongue joint along line A-A in FIG. 2B.
Figure 2B:
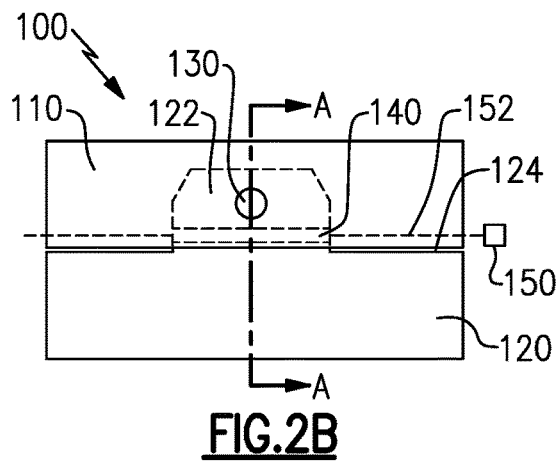
FIG. 2B illustrates an outer diameter looking in view of the first example tongue joint.

FIG. 2A illustrates a cross section of a first example tongue joint 100 along line A-A in FIG. 2B. FIG. 2B illustrates an outer diameter looking in view of the first example tongue joint 100. The tongue joint 100 joins two parts 110, 120. A tongue 122 protruding from an edge 124 of the second part 120 radially inward of the first part 110. As is clear, the edge 124 extends for a first distance that is greater than a distance through which the tongue 122 extends. A bolt 130, or other similar fastener, extends through a corresponding hole in the tongue 122 and the first part 110 and fastens the tongue joint 100. While illustrated and described herein as a tongue extending radially underneath a second part, it should be understood that the cooling features and arrangements described herein can be applied to any radially stacked joint configuration (referred to as a radial stack), and is not limited to the specific tongue shape illustrated herein.

The exemplary bolt 130 is fastened using a nut 132 and washer 134, however another fixing technique able to withstand the heat, vibration, and other engine conditions could be used to similar effect. Similarly, other mechanical fastener styles aside from a bolt 130 could be used to join the parts depending on the needs of a particular system. While illustrated as a single fastener, it is appreciated that additional fasteners, such as adjacent bolts, or more distributed bolts could be used within a single tongue joint 100.

A channel 140 is defined between a radially outer surface 126 of the tongue 122 and a radially inner surface 112 of the first part 110. The channel 140 provides a passageway through which air, or another cooling gas, can flow. The air then provides cooling to the first part 110, the second part 120, or both parts 110, 120. The cooling minimizes or eliminates local hotspots and improves the durability of the joint 100, and thus the durability of the parts 110, 120.

Air is fed to the channel 140 from at least one coolant source 150 that is connected to the channel 140 via a feed line 152. In alternative examples, the air can be fed to the channel using ambient air radially inward of the second part 120, with a pressure differential causing the air to flow into and through the channel 140. In yet other examples, multiple air sources can be used to feed the channel 140. In the example of FIGS. 2A and 2B, the cooling air enters one end of the channel 140, and exits the opposite end of the channel 140 radially inward of the first part 110.

Figure 3:
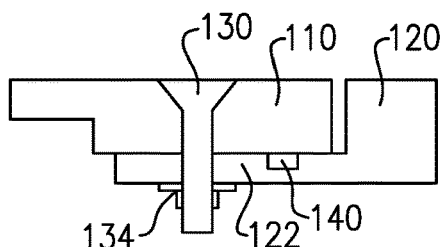
FIG. 3 schematically illustrates a tongue joint including a cooling channel integral to a radially inner tongue.
Figure 4:
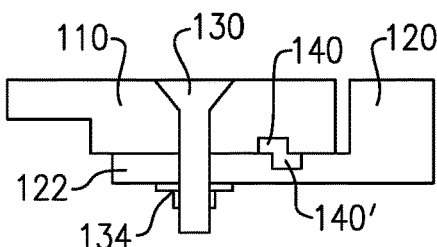
FIG. 4 schematically illustrates a tongue joint including a cooling channel defined by two overlapping channels.

In the example of FIGS. 2A and 2B the channel 140 is integral to the first part 110. With continued reference to FIGS. 2A and 2B, and with like numerals indicating like elements, FIGS. 3 and 4 illustrate cross sections of similar joints, with the channel 140 being integral to the second part 120 (FIG. 3) and with the channel 140 being defined by two overlapping channels 140, 140' (FIG. 4). In the example of FIG. 4, the channels 140, 140' partially overlap, however alternatives can utilize channels 140, 140' that are fully aligned depending on the needs and tolerances of the parts 110, 120. As used herein, a channel 140, 140' being "integral to" a given part 110, 120 refers to the channel being defined at least partially by a groove protruding radially into the part 110, 120. The specific depth and dimension of the channel can be customized, or tailored, to each given application to allow for sufficient airflow through the channel, while still maintaining a proper stiffness at the joint.

Figure 5:
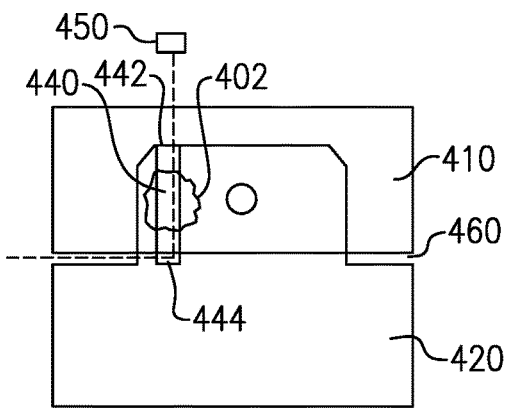
FIG. 5 schematically illustrates a tongue joint including an axially aligned channel (relative to an axis of the engine).

Any given tongue joint can include multiple channels 140, 140' defined on the single joint 100, and the channels 140 can be aligned or oriented to direct cooling air to particular hotspots of the tongue joint 100. By way of example, FIG. 5 schematically illustrates a channel 440 that extends entirely axially along the tongue joint relative to an axis defined by the engine, thereby allowing the cooling air from cooling air source 450 to reach a region 402 of the joint that is particularly susceptible to thermal fatigue (i.e. a hot spot). In the example of FIG. 5, cooling air is provided to the channel 440 through an end 442 that is open to the ambient region radially inward of the first and second parts 410, 420. The cooling air travels through the channel 440 and exits through a leakage path 460 between the first and second parts 410, 420.

Figure 6:
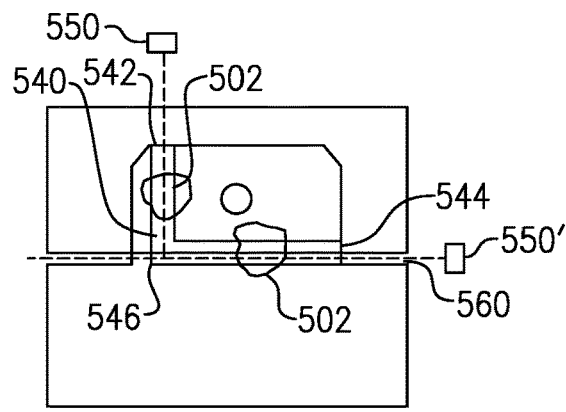
FIG. 6 schematically illustrates a tongue joint including a channel traversing multiple directions and including a corner.

In another example, illustrated in FIG. 6, the channel 540 includes a corner 546 that allows the channel to pass under or through multiple regions 502 that are susceptible to thermal damage. In the example of FIG. 6, each end 542, 544 of the channel 540 receives cooling air from a source 550, 550', and the air escapes the channel through the leakage pathway 560. The corner 546 is illustrated as a 90 degree turn, however, alternate angles and/or arcs can be used to similar effect. In yet another variation of the example of FIG. 6, the channel 540 can be split into two straight channels 540 with each of the straight channels 540 passing through one of the regions 502, and providing airflow through the leakage path 560, but not requiring a connection at the corner 546. In yet another example, the single channel 540 can receive cooling air from only a single end 542, 544 and the cooling air can pass through to the opposite end 542, 544 without exiting through the leakage path 560.

Figure 7:
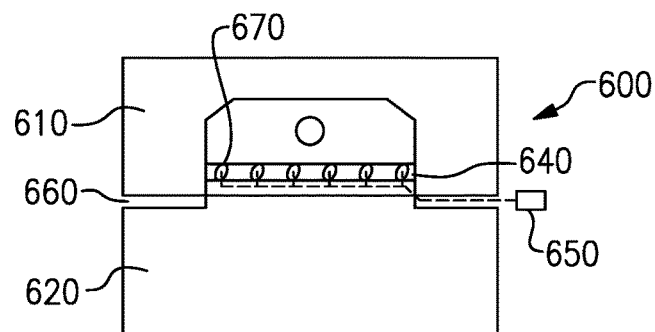
FIG. 7 schematically illustrates a tongue joint including a channel providing air to corresponding cooling holes.

With continued reference to each of FIGS. 2A-6, and with like numerals indicating like elements, FIG. 7 schematically illustrates an example tongue joint 600 in which additional cooling holes 670 are positioned radially outward of the channel 640. The additional cooling holes 640 can be used as the only outlet for the cooling air from cooling air source 650 in the channel 640 in examples where the channel 640 includes no overlap with the interface between the two parts 610, 620. Alternatively, the cooling holes 640 can provide additional cooling flow outlets when the leakage flow through the interface gap 660 is not large enough to provide sufficient airflow.

While illustrated above as single tongue joints, it is appreciated that a joint between two parts can include multiple tongue joints, with each tongue joint utilizing or combining different characteristics of the configurations described above and illustrated in FIGS. 2A-7. Further, the configurations are illustrated individually to minimize the require illustration purely for ease of explanation and are not mutually exclusive examples. Furthermore it should be appreciated that the tongue joints illustrated and described above can be used with any tongue joint interface within the gas turbine engine and are not limited to the combustor panel example.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A method for cooling a radial stack joint comprising:
providing a first part and a second part as a radially stacked joint, the first part including a radially inward facing surface contacting a corresponding radially outward facing surface of the second part over an extent, and one of the contacting radially inward facing surface and the radially outward facing surface being a tongue extending from an associated one of the first and second parts, with a fastener extending through the radially inward facing surface of the first part and the radially outward facing surface of the second part in the extent and configured to maintain the relative positions of the first and second part; and
providing cooling air from at least a first cooling air source to a channel within the radial stack joint, the channel being defined on at least one mating surface of the radial stack joint;
providing the channel between the tongue and another of the first and second parts; and
wherein the channel is formed into the tongue.

2. The method of claim 1, wherein a non-mating surface of at least one of the first and second parts is cooled via a plurality of cooling holes connected to the channel.

3. The method of claim 1, wherein the channel vents the cooling air through an interface gap of the radial stack joint.

4. The method of claim 1, wherein the channel includes at least one corner.

5. The method of claim 1, wherein the first and second parts are panels in a gas turbine engine combustor.

6. The method of claim 1, wherein the tongue protruding from an edge of the associated one of the first and second parts, with the edge extending for a first distance that is greater than a second distance through which the tongue extends.

7. The method of claim 6, wherein the channel is between the fastener and the edge.

8. A method for cooling a radial stack joint comprising:
providing a first part and a second part as a radially stacked joint, the first part including a radially inward facing surface contacting a corresponding radially outward facing surface of the second part over an extent, and one of the contacting radially inward facing surface and the radially outward facing surface being a tongue extending from an associated one of the first and second parts, with a fastener extending through the radially inward facing surface of the first part and the radially outward facing surface of the second part in the extent and configured to maintain the relative positions of the first and second part;
providing cooling air from at least a first cooling air source to a channel within the radial stack joint, the channel being defined on at least one mating surface of the radial stack joint;
wherein the tongue protruding from an edge of the associated one of the first and second parts, with the edge extending for a first distance that is greater than a second distance through which the tongue extends; and
wherein the channel is formed into the tongue.

9. The method of claim 8, wherein the channel is between the fastener and the edge.

* * * * *